United States Patent [19]
Muskulus et al.

[11] Patent Number: 4,852,249
[45] Date of Patent: Aug. 1, 1989

[54] METHOD AND APPARATUS FOR CUTTING CABLES TO LENGTH FROM A CABLE SUPPLY AND PROCESSING THE CABLE ENDS

[75] Inventors: Willi Muskulus, Frankfurt-Bergen-Enkheim; Helmut Kolodziej, Mainatl; Helmut Nitsch, Sulzbach i. Ts., all of Fed. Rep. of Germany

[73] Assignee: Statomat-Globe Maschinenfabrik GmbH, Niederdorfelden, Fed. Rep. of Germany

[21] Appl. No.: 133,960

[22] Filed: Dec. 17, 1987

[30] Foreign Application Priority Data

Dec. 18, 1986 [DE] Fed. Rep. of Germany ....... 3643201

[51] Int. Cl.[4] ........................ H02G 1/12; H01R 43/00
[52] U.S. Cl. ........................................ 29/825; 29/857; 29/867; 29/566.1; 29/745; 29/759; 83/17; 140/102
[58] Field of Search ................. 29/825, 857, 867, 745, 29/748, 759, 566.1; 140/102; 83/17; 81/9.51

[56] References Cited

U.S. PATENT DOCUMENTS

| | | | |
|---|---|---|---|
| 3,100,512 | 8/1963 | Sage | 140/102 |
| 3,369,434 | 2/1968 | Schwalm | 83/17 |
| 4,375,229 | 3/1983 | Mikami et al. | 140/102 |
| 4,464,879 | 3/1984 | Loesch | 29/857 X |

*Primary Examiner*—Howard N. Goldberg
*Assistant Examiner*—Taylor J. Ross
*Attorney, Agent, or Firm*—Albert L. Jeffers; Anthony Niewyk

[57] ABSTRACT

A process and device for the length trimming of cables from a cable supply for the processing of cable ends. The cable front end is inserted by a cable feed (20, 22) in a guide channel whose rear section is located in a swivel part (28). As the cable front end impinges on a stop (102) on the swivel part (28), said swivel part swings beyond a dead center which is defined by a spring (40) which is attached eccentrically, whereafter the swivel part (8) is swung around by the spring (40) essentially 180° so that the cable front end bearing on the stop (102) points opposite to the feed direction. The cable loop formed is then enlarged to the desired length by continued cable feeding, whereafter the cable rear end is severed by a knife (82). By lowering the cable, the cable ends are transferred, accurately positioned, to holders (56) by means of which they can be transported to the processing stations.

11 Claims, 12 Drawing Sheets

METHOD AND APPARATUS FOR CUTTING CABLES TO LENGTH FROM A CABLE SUPPLY AND PROCESSING THE CABLE ENDS

The invention concerns a method for cutting cables to length from a cable supply, for processing the cable ends, where the cable front end is moved into a specific starting position, whereafter a cable loop of a specific length is formed by advancing the cable and the rear end of the cable, after clipping from the supply, is held in a predetermined starting position essentially parallel with the cable front end and aligned with it. The invention also concerns an apparatus for the application of this method, consisting of a feed and length measuring device, a cutting device and a positioning device for placing the cable ends into grippers which can be moved to the processing stations.

For the finishing of cables it is previously known to advance the cable front end in a straight line beyond the desired length and, once cut to length, convey the cables with the ends pointing in opposite directions and transverse to their linear expanse to the processing stations, which are arranged in two parallel rows (German patent document No. 24 40 264). But this arrangement of processing stations requires much space and, in the event of malfunctions, to reach the processing stations, and cross the mounted cables, is very difficult. Another considerable shortcoming of prior art methods and apparatus is the difficulty of advancing the cable front end from the cable supply very quickly across a large distance between the two rows of processing stations and, furthermore, to position the cable front end accurately. The fast advance is hampered by the friction across the entire length of the cable movement, and the desired speed as well as the large distance from the feed apparatus make it difficult to maneuver the far advanced cable front end into a very specific position, such as required for processing.

Previously known from the U.S. Pat. No. 3,283,398 is also an apparatus of the initially cited type where, in addition to feed rollers for the cable, there is also a gripper needed which is movable in the feed direction, so as to guide the cable ends into holders in such a way that in the starting position for the further transport to the processing stations both cable ends point in the feed direction while they are positioned in parallel. Due to this alignment of the cable ends, the feed rolls are unable to feed the cable under light force into a previously formed loop. Instead, they must first form the loop by upsetting the cable which was previously held stretched out, in which process, depending on the type of cable and its various straight stretch positions, it is necessary to apply relatively high fluctuating feed forces which lead to varying slip on the feed rolls and, therefore, irregular cable lengths. Additionally, a carriage with a gripper arm and a pivoting gripper must perform a reciprocating motion essentially across the length of the loop, that is, not only the advancement of the cable but additionally also the retraction motion of the gripper, which practically takes just as long, must take place within the clock time of the system. The gripper places the cable in individual motional steps successively in each of the two holders for the front end and the rear end of the cable. While this type of positioning of the cable ends by means of a guided gripper is relatively accurate, the trade-off is high equipment expense and a long cycle time.

The problem underlying the invention is therefore to provide a method and a device of the initially mentioned type where, with simple means and within a short cycle time, an accurate positioning of the cable ends and also a relatively accurate dimensioning of the cable length are achieved.

This problem is solved by the process in that the front end of the cable is first advanced to a specific intermediate position and after formation of a loop, is then bent over and moved into a starting position wherein the front end points in a direction opposite to the feed direction. By further cable advance the cable loop is then enlarged to the predetermined length and, finally, the cable rear end is clipped from the supply in its predetermined starting position.

In the proposed process, to begin with, the cable needs to be advanced only a short distance and, as the case may be, relatively slowly so as to assume with the front end of the cable the defined intermediate position while the cable is stretched out. By bending the front end opposite to the feed direction the starting position of the front end of the cable is defined for the transfer of the cable to the processing stations. Formed simultaneously with the bending is a loop which is oriented such that the feed device, as the cable is advanced further, now feeds directly into the loop with only a light feed force. Thus, relatively long cables can be trimmed to length at high accuracy, in connection with which it should be noted that the exact positioning of the cable ends is more important than the exact dimensioning of the cable length. The previously practiced prior art fine trimming in one of the processing stations is eliminated. Neither does the rear end of the cable have to be positioned in a separate operation. In the proposed process, this is achieved upon clipping from the cable supply already in the starting position for the transfer to the processing stations.

For the application of the new process an apparatus is provided which is characterized in that the cable front end can be advanced by the feed device, in a swivel component, into a specific position and the swivel part can then be turned with the cable front end so that it points with a directional component opposite to the feed direction, and further in that the cutting device is arranged between the feed device and the swivel part. This device may be of a relatively small and simple design, since the swivel part needs to receive and bend over only the lead end of the cable. For the further cable feed into the formed loop, no grippers or other guide components need to be moved and the increasing loop can also hang from the device without guidance. Lastly, the cutter arranged between the feed device and the swivel part clips the rear end of the cable from the cable supply while the cable is already in a starting position, parallel with the front end of the cable, for the transfer to the processing stations. The feed device runs continuously while the loop is being formed and enlarged, until the loop is clipped.

For a preferred embodiment of the invention it is suggested that the cable front end runs in its advance in the intermediate position on a stop, whereby the bending and transfer into the starting position is initiated. For that purpose it is suggested that a guide channel for the channel follow the feed and length measuring device, on the fixed front section of which channel—viewed in feed direction—the cutting device is arranged while the rear section of said channel is arranged in the swivel component, which is prestressed by a spring and swivels about 180° once it has been moved beyond dead center by the front end of the cable which in the guide channel runs on the stop with the feed force. This design has the advantage of an automatic mechanical mode of operation without requiring monitoring and control devices, which are susceptible to malfunction. There is no positioning which is more accurate than one by a simple stop and, besides, there is no safer indication for the proper moment of bending the cable over by means of the swivel part than when the advancing cable itself moves the swivel part beyond dead center and initiates thereby the further swivel motion by means of spring force.

To ensure that the cable front end will remain in contact with the stop during the swivel motion and thus reaches at the end of the swivel motion a predetermined starting position for the transfer to the processing stations, barbs, for instance in the form of elastic tongues set obliquely against the cable, are in a further preferred design of the invention provided on the rear section of the guide channel, preventing the cable from being pulled back in the guide channel.

Another suitable measure for preventing that an easily flexing cable will on account of the feed and frictional forces be upset and veer off sideways is constituted in that the feed device consists of a pair of parallel conveyer belts between which guide bars are arranged which guide the cable sideways. Following the guide bars, the mentioned guide channel assumes the cable guidance during feeding. The guide bars and the parts with the guide channel should suitably be easy to replace and adjustable in such a way that the clearance between the guide bars and in the guide channel can be adapted to the cable cross-section being processed, so that each cable can be guided with as little play as possible.

Depending on individual application, the cable ends should protrude more or less far from the holders which carry them in processing. This adaptation to varying manufacturing requirements, too, can in a suitable development of the invention be accomplished in that, for one, the length of the rear part of the guide channel is variable by adjustment of the stop or by exchange of the swivel part and, for another, in that the cutting device is arranged on the front part of the guide channel so as to be adjustable in the feed direction of the cable.

Since the cable ends inventionally assume their starting positions as the rear end of the cable is clipped, they can in a further preferred embodiment of the invention be transferred simultaneously to a conveying device, essentially in a direction normal to the common plane of their longitudinal center axes, by which device they are then transferred in their parallel position to the processing stations. To that end, the guide channel has behind the cutting device a lowering bottom with a cutout in the area of which the cable ends can be placed in the holders as the bottom is being lowered. To prevent the cutout in the bottom from causing disturbances as the cable front end is initially advanced up to the stop, it is additionally suggested that the cutout can be covered by a bottom part which during the lowering swings out sideways, in the area occupied by the rear end of the cable, as the bottom is being lowered.

The cable ends have in their starting position in the guide channel a cross-sectional position which is determined by the channel cross-section and where the strands in the cable lie side-by-side in a certain way. For the cable ends to also proceed into the holder in this predetermined cross-sectional position, a further preferred embodiment of the invention provides that prior to lowering the bottom of the guide channel an upper tool can be lowered on which a knife of the cutting device and, via springs, several plungers for forcing the cable down on the lowerable bottom are installed. Moreover, operating plungers for opening the holders are also mounted, preferably on the upper tool, so as to perform with a single stroke simultaneously as many functions as possible. This objective, lastly, is served also by another preferred measure, of mounting on the upper tool a control cam which interacts with a guide roll which is connected by lever arm with the bottom part that swings out sideways.

In order to attach in the case of multi-stranded cables different connectors to the various strands which are signified by the color of their insulation, the strands must be automatically recognized by means of an electronic color recognition device and, as the case may be, moved into a specific position for attachment of the coordinated connectors. However, electronic color recognition has so far been plagued by frequent malfunctions, which are attributable to the talcum which is usually introduced between the cable sleeve and the individual insulated strands, depositing in varying thickness on the colored insulation of the strands and making the failure proof color recognition of parts impossible. With little success, attempts have so far be made at shaking or wiping the talcum off. However, the talcum adheres too firmly. The invention now suggests for the first time that at least on one cable end, upon removal of the cable sleeve, the strands be wiped by rotating brushes whose friction force acts essentially in the longitudinal direction on the ends of the strands. Accomplished thereby, in addition to the desired removal of talcum, is a sparing untwisting, i.e., an essentially parallel alignment of individual strands. The brushes preferably include recesses on their circumference, so that the talcum also will be knocked off. While the cable ends are being processed, the cables suspend in the form of loops. To ensure nonetheless an orderly delivery upon completion of processing, a practical embodiment of the invention provides for dropping one of the two cable ends held by the conveyer device while the other continues to be transported, that the cable be pulled over a deposit.

The mode of operation illustrated above is suited for cables and strands of any length when relatively short connectors or other parts are attached to the cable ends. But in the manufacture of ignition cables it happens that relatively long protective caps need to be applied on relatively short cables of, e.g., about 20 cm length. To offer a solution also for such applications, the invention provides that the swivel part remains in its starting position in which the rear part of the guide channel is in alignment with its front part, until the cable is clipped and transferred to a holder, and that the cable ends can be processed by processing stations which are arranged on opposite sides of the conveying path of the holders, where it is possible that the cables are axially movable between two subsequent but opposite processing stations, by a gripper, while the holders are temporarily released. As required, it is thus possible, e.g., to slip protective caps from one cable end on the cable, which in finished condition are supposed to cover one cable end.

The invention will be more fully explained hereafter with the aid of the drawing.

Figure 1:
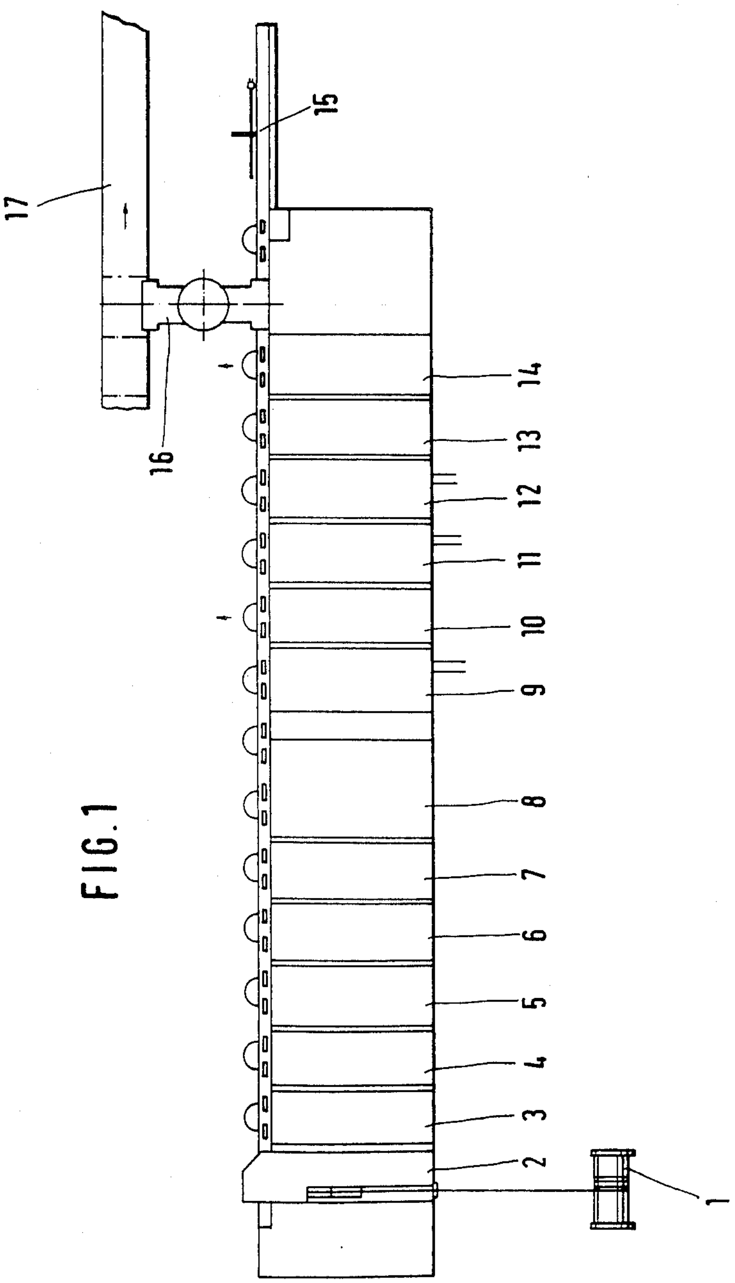
FIG. 1 shows a schematic plan view of an apparatus for cutting cables to length and processing the cable ends.
Figure 2:
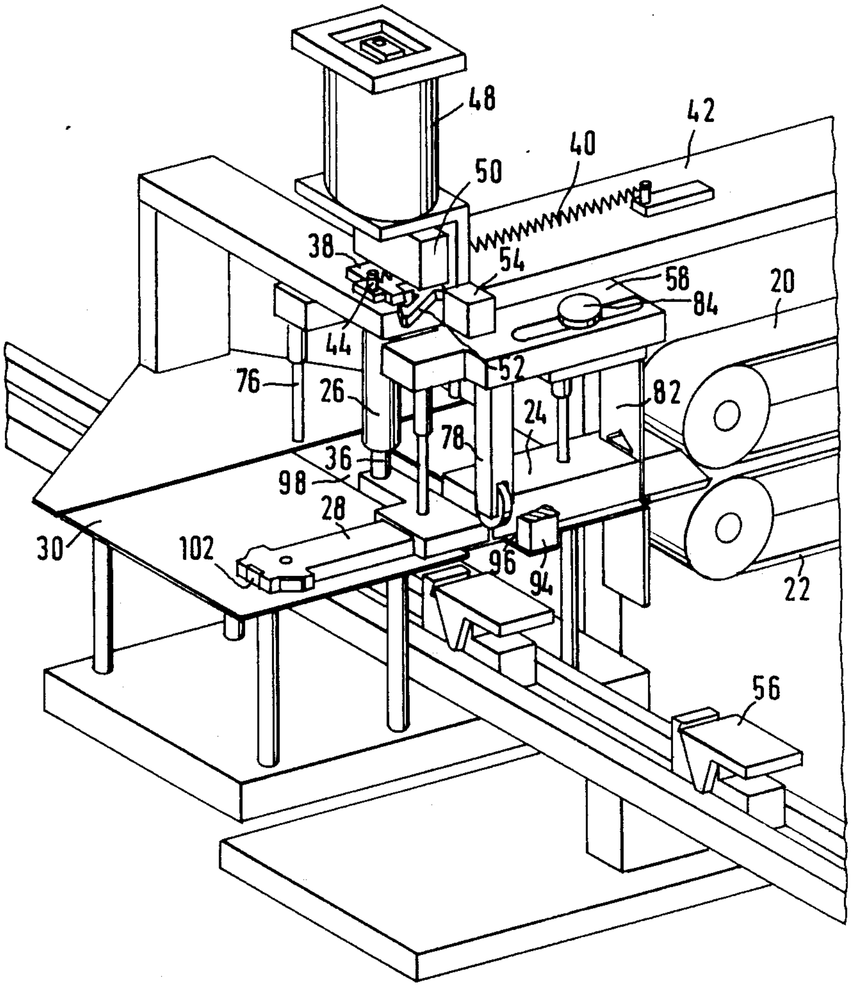
FIG. 2, shows a perspective view of the length trimming and positioning device in starting position of the apparatus according to FIG. 1.
Figure 3:
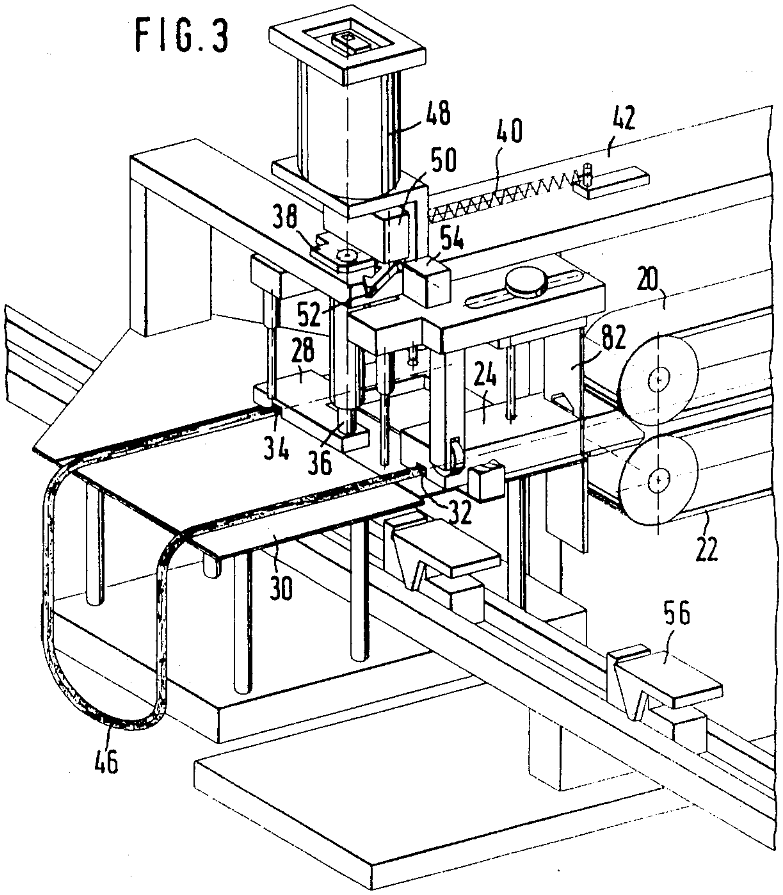
FIG. 3, shows the device according to FIG. 2 in an intermediate position.
Figure 4:
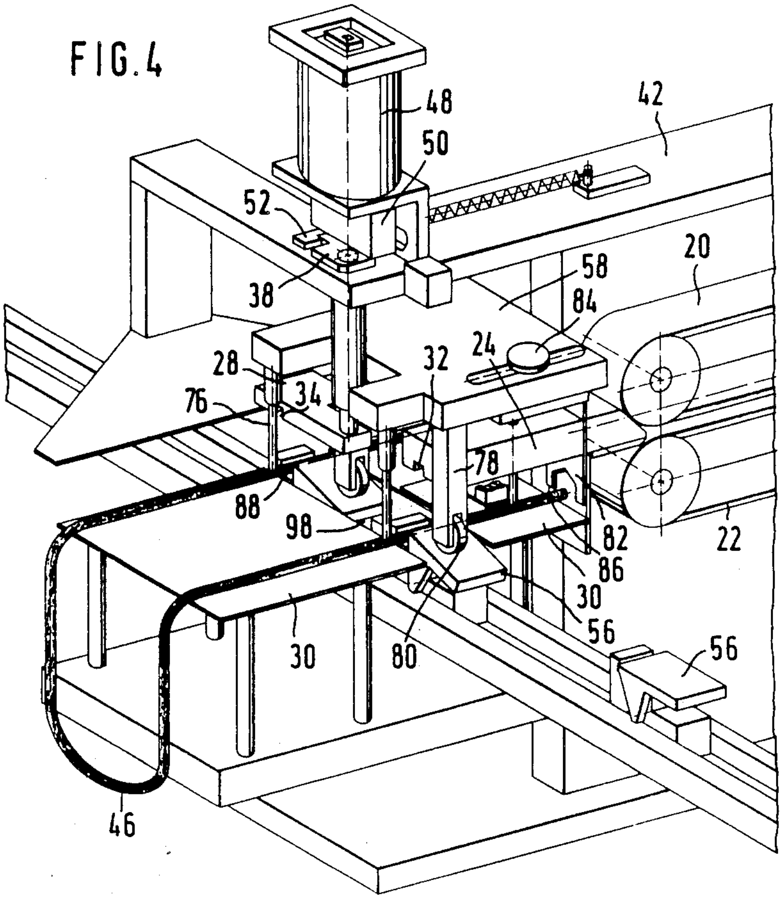
FIG. 4, shows the device according to FIGS. 2 and 3 in its limit position while transferring a cable to holders for conveying it to the processing stations.
Figure 7A:
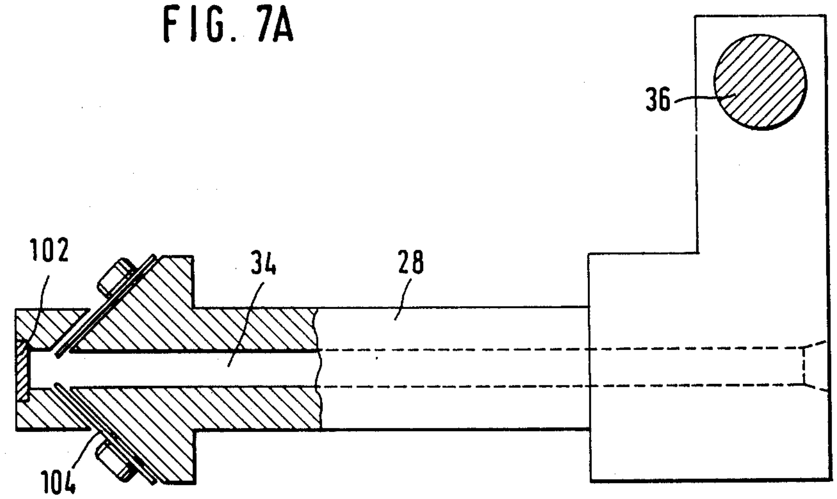
Figure 8A:
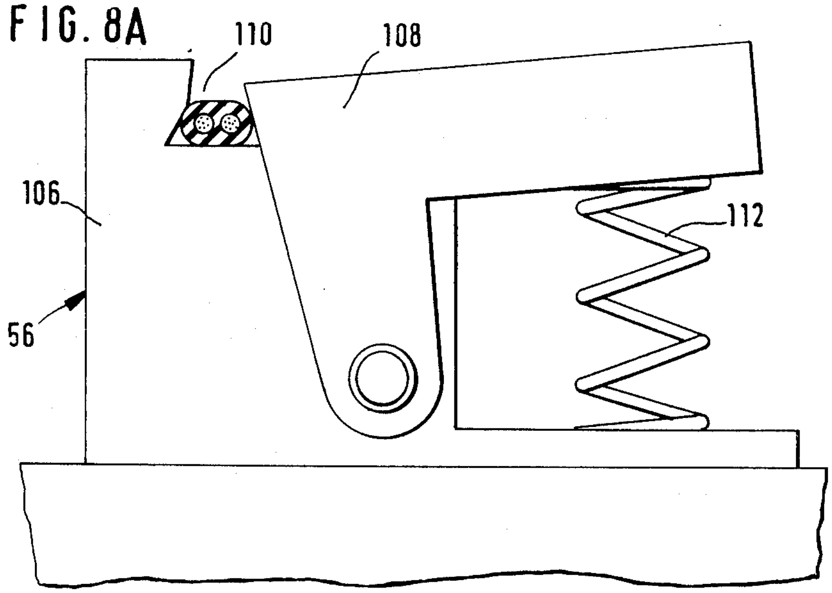
Figure 9:
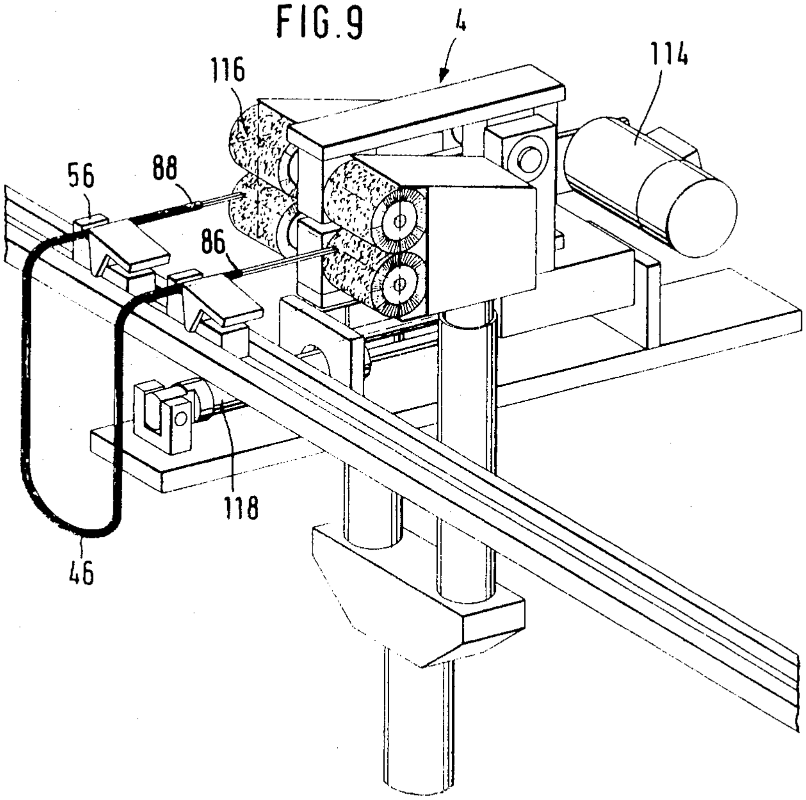
Figure 10:
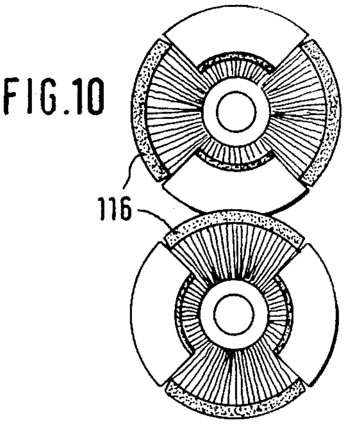
Figure 11:
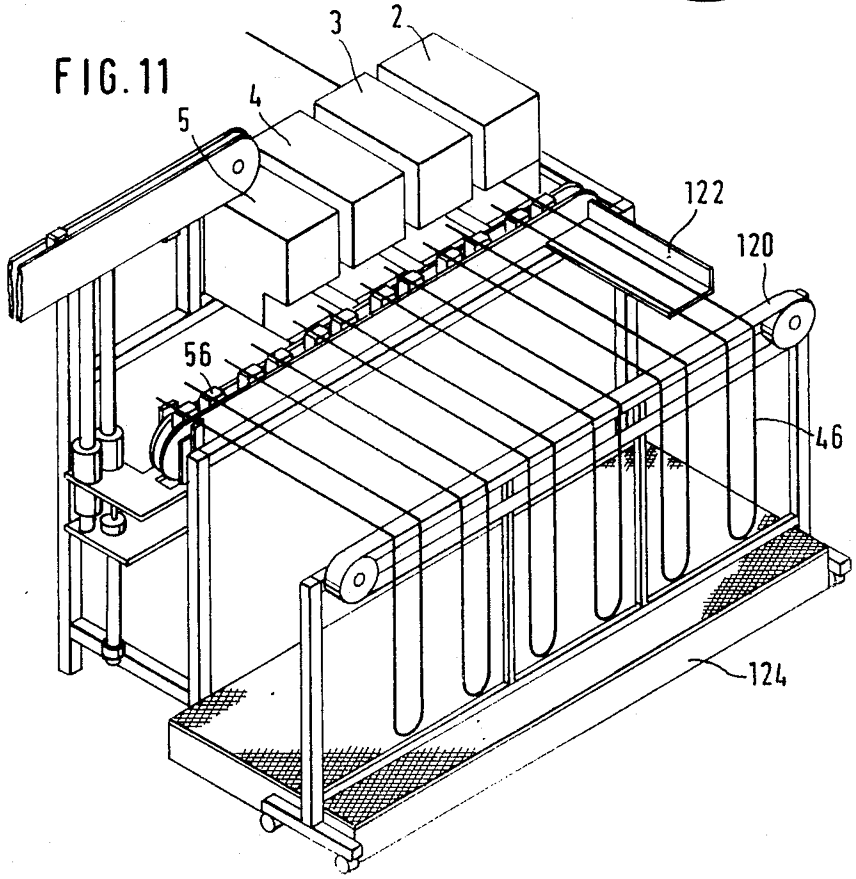
Figure 12:
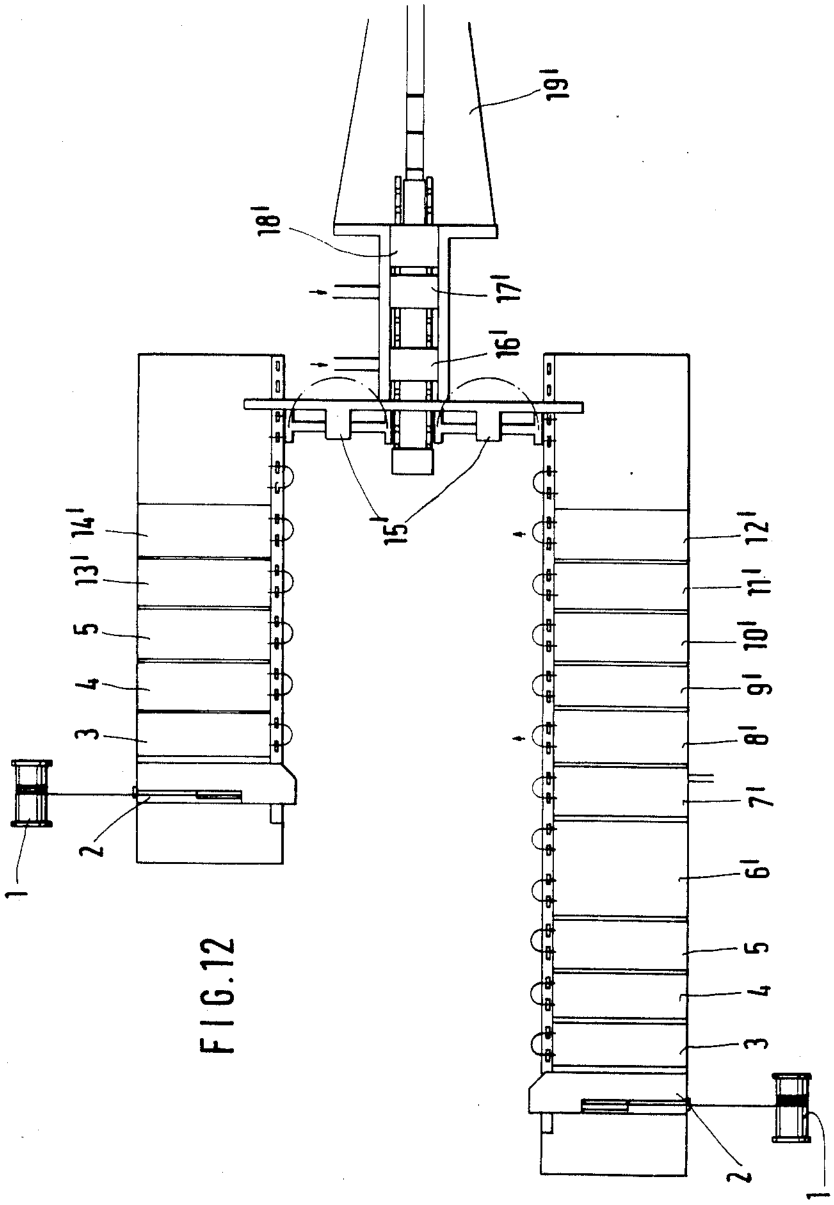
Figure 13:
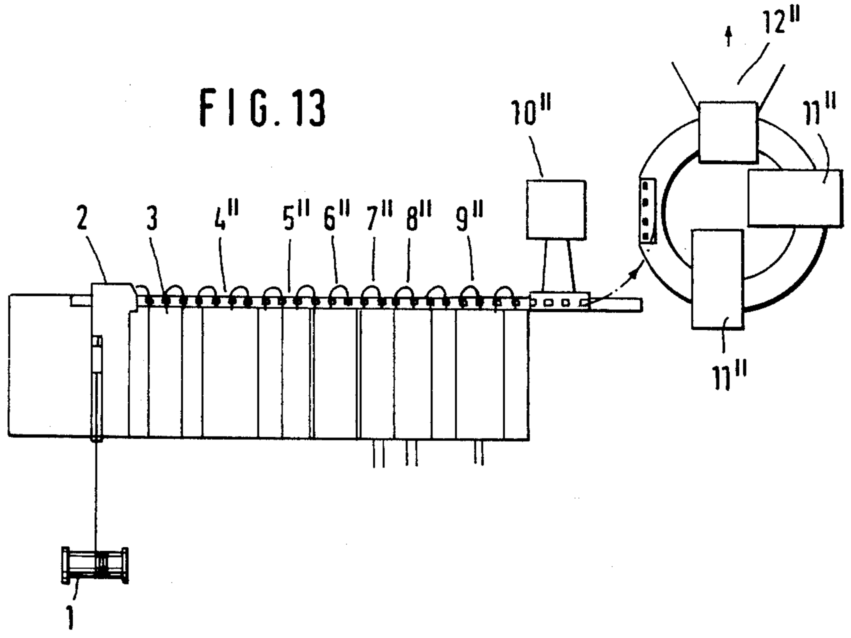
Figure 14:
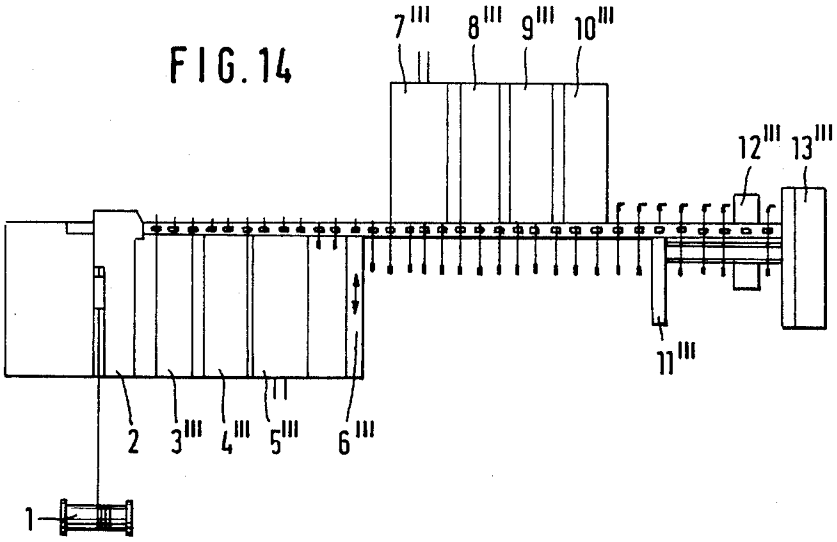

FIGS. 7A, B, show horizontal cross-sections of a swivel part with a cable guide channel of the device relative to FIGS. 2 through 5A without respectively with cable;

FIGS. 8A, B, show side elevations of the holders shown in FIGS. 2 through 4, with various cables being retained;

FIG. 9, shows a perspective view of a processing station with revolving brushes of the apparatus according to FIG. 1;

FIG. 10 shows a vertical cross-section of a rotating brush pair processing station according to FIG. 9;

FIG. 11 shows a simplified perspective view of an apparatus to FIG. 1 intended for the finishing of long cables;

FIG. 12, shows a simplified plan view of an apparatus for the manufacture of lamp cables with a switch in the center;

FIG. 13, shows a plan view of an apparatus for the manufacture of ignition cables with distributor and spark plug connector;

FIG. 14, a plan view of an apparatus for the manufacture of short ignition cables with connector boots.

FIG. 1 gives an overview of the serial arrangement of the processing stations of an inventional apparatus for the finishing of cables. As can be seen, the processing stations are freely accessible from both sides without any interference by the cables being processed.

According to FIG. 1, in particular, a cable is reeled off a supply 1 and fed to a length trimming and positioning device 2 in which individual cables are cut to a specific length and accurately positioned with their ends. These cables are then transferred by means of a conveying organ, successively, to the other processing stations shown which, except for the peculiarities described hereafter, may basically be of a known type and depend in the particular application on the respective manufacturing requirements. Shown in the case of the example is a station 3 for stripping the cable ends, next a station 4 for brushing the exposed cable strands, then a station 5 for axial alignment, i.e., turning and aligning the cable about its longitudinal axis, which is followed by a crimping press 7 which crimps to the end of the cable which eventually will be connected with the electrical appliance the connector provided for that purpose. Following then is a twisting station 8 which on the other end of the cable twists the wires of the strands so that then, in the subsequent station 9, a plug bridge can be crimped to the twisted strand ends, the feeding of which bridges to the processing station 9 is indicated. The next station 10 is a checking station, and in the following stations 11 and 12 there are attached to the plug bridge first an upper and then a lower half shell of a plug, which in the subsequent processing station 13 are welded by supersonic sound. Marked 14 is another checking station, whereafter the completely finished cables are placed on a deposit 15.

When the plug is not to be assembled from half shells welded to each other, but is to be produced by an injection molding operation, the processing stations 11 through 14 are skipped. Instead, several cable ends to which a plug bridge has already been attached and to which the plug housing is yet to be injection-molded, are picked up by a gripper 16 and placed on a transfer device 17 which introduces these cable ends in a not illustrated injection molding frame, where several plugs are then injection-molded simultaneously.

Illustrated perspectively in FIG. 2, the length trimming and positioning device marked 2 in FIG. 1 has two parallel conveyer belts 20, 22 which can be driven so as to revolve, take between themselves frictional hold of the cable coming from the cable supply 1 and feed it from right to left with regard to FIG. 2. In the process, the cable is slipped into a guide channel whose front part, viewed from the feed direction 20, 22, is fitted in the underside of a fixed guide block 24 and its rear part in the underside of a swivel part 28 which swivels about a vertical axis 26. In the starting position shown in FIG. 2, the guide channels in the guide block 24 and the swivel part 28 are in alignment. Downwardly they are sealed off by a lowerable bottom 30 on which the cable slides while being advanced in the guide channel and whose front part, in FIG. 3, is marked 32 while its rear part is marked 34.

The swivel part 26 is mounted eccentrically on a shaft 36 which is also connected in rotationally fixed fashion with a flat crank 38. Attached to the crank 38, eccentric to the axis of rotation 26 of the shaft 36, is a prestressed tension spring 40 whose other end is fastened on the fixed frame 42 of the apparatus. In the actual embodiment, the stud bolt 44 by way of which the spring 40 is attached to the crank 38 can be adjusted relative to the axis of rotation 26 so that the torque which is exerted by the spring 40 on the shaft 36 can be varied by adjusting the point of attachment of the spring to the swivel part 38. However, the spring 40 is so arranged relative to the axis of rotation 26 that in the position of the swivel part 38 illustrated in FIG. 2 the spring force tends to rotate the shaft 36 counterclockwise as shown in FIG. 2, holding the swivel part 28 in contact with the guide block 24. But when the swivel part 28 is turned counterclockwise just a little, the stud bolt 44 with the spring 40 proceeds through the dead center position, whereafter the spring 40 pulls the shaft 36 with the swivel part 28 clockwise into the position shown in FIGS. 3 and 4, turned by 180°. A cable front end contained in the guide channel 34 in the swivel part 28 is thereby bent over to the rear, i.e., opposite to the direction of cable feed, so that a U-shaped cable loop is formed which by further cable advance by means of the conveyer belts 20, 22 can be enlarged as desired, as is illustrated in FIG. 3 on the example of a cable loop 46.

In order to swing the swivel part 28 from the limit position shown in FIGS. 3 and 4 back again into the starting position of FIG. 2, after clipping and transfer of a cable loop 46, there is a reversible pneumatic motor 48 provided on the driven shaft (not shown) of which, a crank 50 is mounted to which, eccentric to the driven shaft, a hook 52 is mounted in swingable fashion. The hook 52 is stressed by a spring (not shown) which tends to swing the free end of the hook toward the axis of rotation 26. In the process the hook 52, in the position shown in FIG. 2, can engage a projection of the crank 38 and the motor 48, in the engaged position, can drive the shaft 36 in both directions of rotation by way of the crank 50, hook 52 and crank 38. When the crank 50 is in the position shown in FIGS. 2 and 3, a pneumatic ram 54 can bear down on the rear end of the hook 52, thereby disengaging it from the crank 38.

Figure 5A:
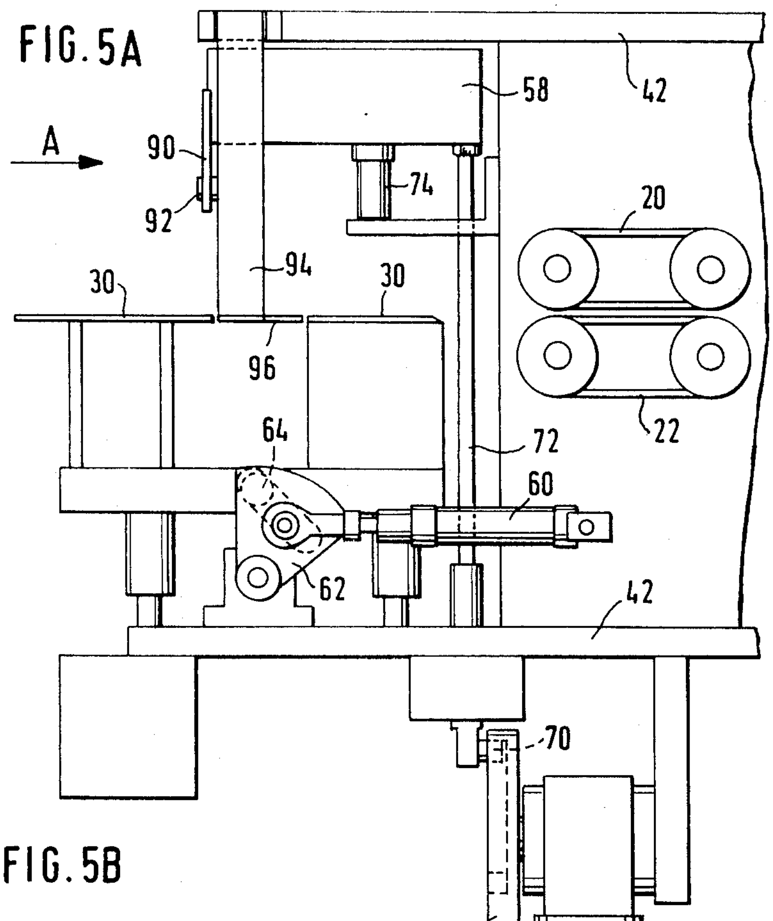
FIG. 5A, shows a simplified illustration of the stroke drives of according to FIGS. 2 through 4.
Figure 5A:
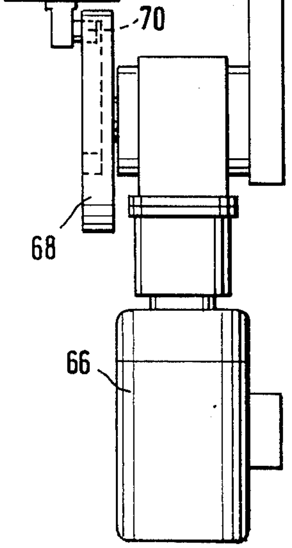
Figure 5B:
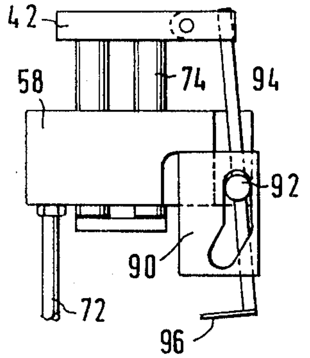
FIG. 5B, shows a partial view according to arrow A in FIG. 5A.

To insert the ends of the generated cable loops 46 in holders 56, the bottom 30 and an upper tool 58 can be lowered from the starting position shown in FIG. 2 into the bottom position illustrated in FIG. 4. The stroking drives of the bottom 30 and upper tool 58 are illustrated in FIGS. 5A, B. The lowering and raising of the bottom 30 can be accomplished with a power cylinder 60 by which a cam which is rotatably mounted in the frame 42 can be rotated back and forth. Mounted on the bottom 30 which is movable in vertical direction, a follower roll 64 engaging the cam 62 moves the bottom 30 up and down as the cam 62 rotates.

Serving as drive for the upper tool 58, in the case of the example, is a rotary drive motor 66 driving in rotating fashion a cam 68 whose track interacts with a follower stud or a follower roll 70 which is mounted on a control rod 72 that moves in vertical direction and which, in turn, is connected with the upper tool 58. The latter is movable on vertical guideways 74.

Installed on the upper tool 58 by way of compression springs (not shown), in the case of the example, are four posts 76 serving to force the cable ends, according to FIG. 4, firmly on the bottom 30 preventing them from shifting and turning. Additionally provided on the upper tool 58 are two operating posts 78 with rollers 80 at their bottom end by which the holders 56 are opened, as shown in FIG. 4.

Fastened on the upper tool 58 is additionally a knife 82 which, as the upper tool is being lowered, severs the cable behind the feed device 20, 22. The knife 82 is adjustable in the feed direction of the cable by means of a bracket 84. Since the knife 82 passes through the guide block 24, another position of the knife 82 requires also another guide block 24. Depending on the position of the knife 82, the rear end of the cable marked 86 protrudes more or less beyond the holder 56 by which it is retained. The free end of the cable front end 88 beyond the holder 56 retaining it is determined by the length of the guide channel in the swivel part 28.

Lastly, a cam 90 is permanently mounted on the upper tool 58, according to FIGS. 5A, B the track of which cam interacts with a follower stud or a follower roll 92 mounted on a lever 94 which, in turn, pivots on the upper end of the frame 42 and supports on the lower end a bottom part 96 which in the starting position shown in FIG. 2 partly covers a cutout 98 in the bottom 30. In the position shown in FIG. 2, the bottom part 96 is in the same plane as the bottom 30 and contributes to the guide channel 32, 34 in the guide block 24 and in the swivel part 28 being sealed off at the bottom across its entire length. But as the upper tool 58 is being lowered, the lever 94 with the bottom part 96 attached to it is swung out sideways by means of the cam 90 and the follower roll 92, thereby exposing the cutout 98 in the bottom 30 and permitting the cable to be inserted in the holders 56 in the area of the cutout.

Figure 6:
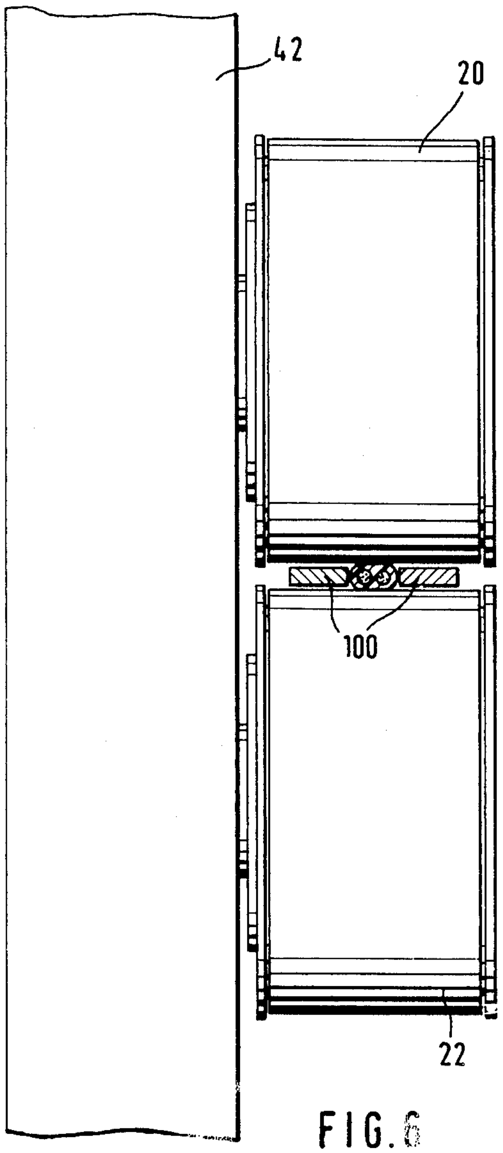
FIG. 6, shows a vertical cross-section of the cable feed device of the apparatus shown in FIGS. 2 through 5A.
Figure 7B:
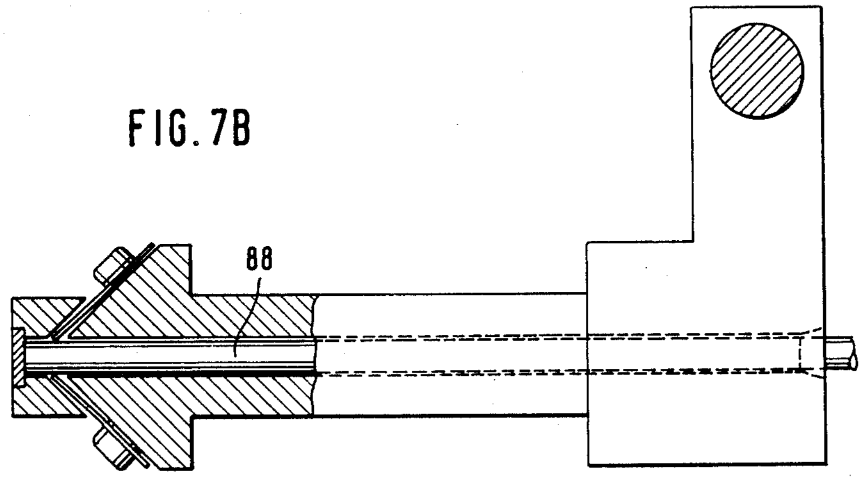
Figure 8B:
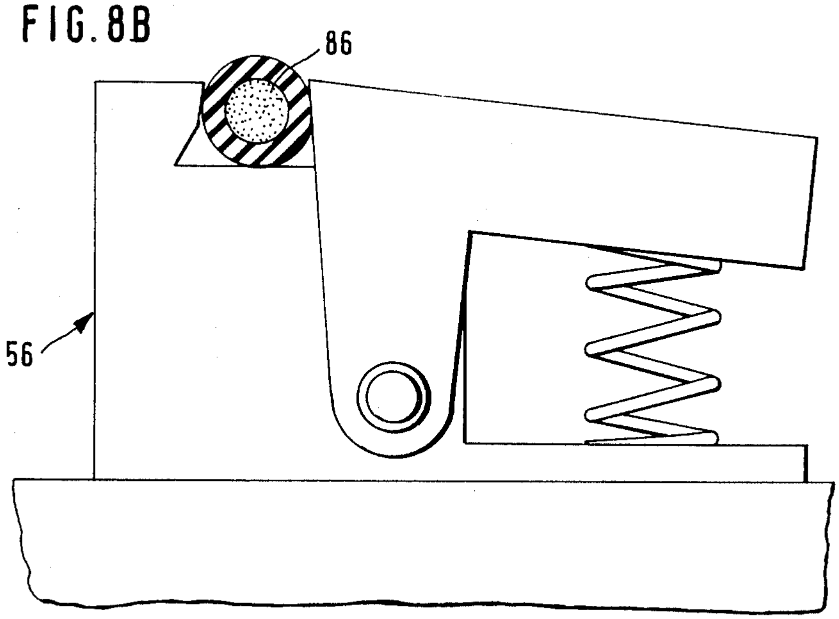

FIGS. 6 through 8 depict additionally some details of the apparatus of FIGS. 2 through 5. Illustrated in FIG. 6, as a vertical cross-section of the feed device consisting of the conveyer belts 20 and 22, is the guidance of the cable by the lateral guide bars 100. Their height is somewhat less than that of the cable and they may be attached, e.g., to the guide block 24. Such lateral guide bars are normally needed only in the case of very flexible cables, for instance for electric shavers. The feed length of the cable can be determined by a measuring device which measures the number of revolutions respectively the angle of rotation of the drive rolls of the conveyer belts 20 and 22.

The illustration of the swivel part 28 in FIGS. 7A, B in cross-section, shows that the guide channel is sealed on the extreme end by a stop 102 on which the cable runs in the position according to FIG. 2, as can be seen from FIG. 7B. Screwed to the swivel part 28, shortly before the stop 102, are two elastic tongues 104 whose free ends protrude in the feed direction obliquely in the guide channel 34, in a way such that they will be deflected from the position according to FIG. 7A to the position according to FIG. 7B by a cable fed into the guide channel. In this position they act as barbs which prevent a retraction of the cable front end 38 from the stop 102.

Illustrated in FIGS. 8A, B is a holder 56 for retaining two different cables. Each holder consists of a base 106 and a top part 108 pivoting on it, forming together a pair of tongs 110. The cable contained in the pair of tongs is retained by a compression spring 112 which is mounted between the base 106 and the upper part 108. To spread the tongs 110, all that is necessary is pushing from above on the upper part 108 against the force of the compression spring 112 as is done by the rolls 80 of the operating posts 78, e.g., according to FIG. 4. The pair of tongs has an essentially dovetailed cross-section so that the same holders can safely retain cables with very different cross-sections.

With their bases 106, the holders 56 are mounted, e.g., on a revolving continuous conveyer belt or other pulling organ which passes along the various processing stations and is stepped in such a way that the cable ends retained in the holders 56 will during the scheduled clock time be stopped each time at a processing station and processed there.

The operating mode of the apparatus shown in FIGS. 2 through 8 is as follows:

While the components of the apparatus assume the position shown in FIG. 2, the conveyer belts 20, 22 feed cable through the front guide channel 32 in the guide block 24 and further on through the aligned guide channel 34 in the swivel part 28. The cable front end which abuts against the stop 102 exerts on the shaft 36 a torque which is sufficient to swivel, with the hook 52 opened by the pneumatic push rod 54, through the dead center position of the spring 40. Once this has occurred after a short swivel path, the spring 40 pulls the swivel part 28 essentially up into the position according to FIGS. 3 and 4, swiveled back by about 180°. Once the dead center position has been passed, the motor 48 receives a control signal and causes the hook 52 to follow the swivel part 28 in the same direction of rotation in which it has been swiveled, with the hook 52 firstly being released from the pneumatic push rod 54 and then engaging the crank 38 rotationally fixed in the position according to FIG. 4. In addition to the spring 40, the motor 48 now exerts a torque on the shaft 36, rotating the swivel part 28 dependably into its rearward position according to FIGS. 3 and 4 and keeping it there.

Following the swing-out of the swivel part 28 and the associated formation of th cable loop 46, the feed device 20, 22 continues to feed cable from the supply into the loop until a predetermined cable length is reached. The feed speed may be relatively high, since only relatively slight friction forces need to be overcome and the exact position of the cable front end 88, determined by the stop 102, is not influenced by feeding further cable into the loop 46. The feed device 20 feeds without interruption during the entire process of loop formation by means of the swivel part 28 and during the feeding of further cable into the loop.

As soon as the predetermined cable length has been reached, the upper tool 58 begins to lower and the posts 76 push down on the cable, partly through the guide block 24 and the swivel part 28. Due to the springs installed between the upper tool 58 and the posts 78, the upper tool 58 can continue to lower while the posts 76, under increasing spring tension, force the cable onto the bottom 30 keeping it in position. Approximately as the cutting edge of the knife 82 makes contact with the cable rear end 86 the bottom 30 begins to lower too. This occurs essentially in synchronism with the lowering motion of the upper tool 58. The cable rear end 86 is severed in the process from the cable supply by the knife 82. The posts 76 hold the cable loop 46, specifically its ends 86 and 88, in safe contact with the bottom 30 also during the lowering motion, in which the guide block 24 and the swivel part 28 do not participate, so that the cable is in this downward motion forced out of the guide channels 32 and 34 in the guide block 24 and swivel part 28. As the lowering motion continues, also the bottom part 96 beneath the cable rear end 96 swings out sideways, and the further lowering of the upper tool 58 and the bottom 30 causes the rolls 80 on the push rods 78, in the area of the cutout 98 in the bottom 30, to push down on the upper parts 108 of two holders 56, which pivot under spring force, which have been moved in a position such that the cable front end 88 and the cable rear end 86 each position themselves in the bit 110 of the holder 56, such as illustrated in FIG. 4.

At this juncture it is pointed out that underneath the cable front end 88 there is not bottom part similar to the bottom part 96 required in the position according to FIG. 3, since the cable front end 88 is already in the guide channel 34 and in contact with the stop 102, where it is held safely, while the swivel part 28 moves at the end of the swing from the position according to FIG. 2 into the position according to FIG. 3 over the cutout 98, with the end section of the guide channel 34 opposite the stop.

As soon as the cable ends 86 and 88 have been placed in two holders 56, the upper tool 58 begins to retract upward, and as soon as the cable ends 86 and 88 have been clamped down in the holder bit 110, caused by the retraction of the rolls 80 from the top parts 108 of the holders 56, and the posts 76 have released the cable, the drive of the conveyer moving the holders 56 is activated transferring the cable loop 46 that has just been clipped to the first processing station. When the cable loop has left the bottom 30 due to the transport of the holders 56, the bottom returns to its starting position according to FIG. 2, upward, closing the guide channel in the guide block 24 and pivoting part 28 on the downside. As soon as the posts 76 have been sufficiently retracted upward, the motor 48 also rotates the shaft 36 with the swivel part 28 via the crank 50, hook 52 and crank 38 back into the starting position according to FIG. 2. Immediately after the starting position has been assumed, the hook 52 is also disengaged from the crank 38 by the pneumatic push rod 54, so that the next cable feed can begin and the next swivel motion of the swivel part 28 can be initiated by striking the stop 102.

FIG. 9 shows the brush station 4 which in perspective is shown in FIG. 1. It comprises two pairs of brush rollers which are rotated by means of a motor 114. These brush rollers are axially movable with the aid of a power cylinder 118, relative to the cable ends 86 and 88 and, in their motion, first approach the holders 56 and then retract again with a direction of rotation such that on the cable ends 86 and 88 a traction force directed toward their free ends is exerted untwisting the strands which have been exposed by removing the insulation sleeve from the cable ends, and are aligned essentially in parallel. Besides, the brush rolls 116 clean the differently colored external insulations of the strands so that these, in the following processing station, can be electronically recognized, turned into a predetermined rotary position of the cable cross-section by rotational straightening while the holders 56 are released, which is followed by removal of the insulation and attachment of the correct, coordinated connector.

FIG. 10 shows in cross-section a preferred embodiment of the brush rollers 116 in the processing station 4. As can be seen, the brush rollers are provided with cutouts on the circumference, the arrangement being according to FIG. 10 preferably such that the bristles of the one brush roller engage a cutout in the other brush roller. In variation from FIG. 10, more than two cutouts and bristle-tipped sectors can be provided on the circumference of each brush roller. Moreover, it is possible for each brush roller to be composed of a number of narrow brush disks, where each disk is provided, in an offset arrangement relative to adjacent disks, with cutouts between the bristles on the periphery. The bristles extend in this case preferably not only radially but are more so tufted, i.e., have also axial directional components, so that between the bristles of adjacent disks there will be no space that is free of bristles. Lastly, it is also possible to arrange the bristle areas helically along the axes of the brush rolls.

FIG. 11 shows another embodiment of the apparatus according to FIG. 1, in which provision has been made for supporting long loops. This embodiment is intended especially for the finishing of especially long cables, for instance vacuum cleaner cables. A companion conveyer 120 is arranged parallel with the row of processing stations—of which in FIG. 11 only the first processing stations 2–5 are shown for simplicity. The spacing from the row of processing stations 2–5 is variable and can be adjusted according to the length of the cable loops 46 to be finished. On the length trimming and positioning device 2 there is a guide plate 122 provided which at this processing station prevents the cable loop 46 from dropping with its closed end to the floor while being formed and enlarged. Operationally slightly tilted, the guide plate 122, which may also be of a telescopic design, guides the closed end of the cable loop 46, during enlargement to the required length over the companion belt 120, in such a way that the cable loop 46, as shown in FIG. 11, with droop over the companion conveyer belt 120 with the closed end of the loop pointing to the floor. The companion conveyer belt 120 is driven in synchronism with the conveyer belt moving the holders 56, so that all cable loops 46, even if they are very long, will remain aligned parallel as they are transferred from one processing station to the next and will not become entangled.

Since the cable loops 46 hang loosely over the companion conveyer belt 120, they do not impede access to the processing stations from the side of the companion conveyer belt 120. According to FIG. 11, however, the companion conveyer belt 120 can also be given a frame separate from the frame of the processing stations, which can be moved separately and removed when such is necessary for repair or servicing of the processing stations.

Illustrated in FIGS. 12 through 14 are additional embodiments of cable processing apparatuses, modified relative to FIG. 1. In the case of FIG. 12, two lamp cables are first prepared on their ends on two parallel rows of processing stations operating from the same clock, which cables are then assembled on a third line of processing stations and connected with a switch which in the end is arranged in the center part on the whole cable. In particular, the reference numerals 1 through 5 signify again the same units as in the embodiment according to FIG. 1. Besides, 6′ is a stripping and twisting station, 7′ a plug bridge crimping station, 8′ a checking station, 9′ and 10′ assembly stations for a lower respectively upper plug half shell, 11′ a supersonic welding station for connecting the plug half shells, and 12′ a checking station. Manufactured on the line shown in the bottom part of FIG. 12 is the cable component which on its end has a plug while the other end is connected with a line switch. On the other line, shown in the top part of FIG. 12, the cable part is finished which leads from the switch to the lamp. Marked 13′ is a stripping station, while 14′ marks a crimping press for connectors on the appliance end. Twin grippers 15′ join the cable ends which are to be connected with the switch so that then, in processing stations 16′ and 17′, the assembly of the bottom and top parts of the switch can take place. 18′ is a checking station while 19′ marks a deposit for completed cables provided with the switch. As can be seen, all of the stations are easily accessible, despite the spatially compact arrangement of processing stations and the number of cables which are being processed at the same time.

FIG. 13 shows a system for the manufacture of ignition cables with distributor and spark plug connectors. The reference numerals 1, 2 and 3 have the same meaning as in the embodiment according to FIG. 1. Additionally, 4″ indicates a crimping press for connectors, 5″ a checking device, 6″ a glycerin dosing device, 7″ an assembly station for straight distributor plugs, 8″ an assembly station for spark plug connectors, 9″ an assembly station for angled distributor plugs which can be used as an alternative to stations 7″, 10″ is a pivoting gripper which grabs two ignition cables at once and transfers them to a rotary conveyer with three processing stations, while 11″ indicates two stations where two plugs are simultaneously threaded, so that the cycle time for one threading operation may take, e.g., eight seconds, whereas the processing stations 2 through 9″ operate at a clock of four seconds. Lastly, 12″ marks a checking station.

The apparatus according to FIG. 14 is used for the manufacture of short ignition cables with booted plugs. In this case, the short ignition cable while in the length trimming and positioning device 2 is not looped and mounted with both cable ends in holders 56, but the swivel part remains in the position according to FIG. 2 and the short cable is placed only with one end in a holder 56. The mounted cable end proceeds then to a stripping station 3‴ and a connector crimping press 4‴. Following in the processing operation is an assembly station 5‴ where a plug connector with boot is applied on the mounted cable end. The next processing station 6‴ features a gripper which, while the holder 56 is temporarily opened, pulls the cable in a longitudinal direction through the bit 110, whereafter the other cable end will be clamped down in the holder 56. The following processing stations are arranged on the opposite side of the cable conveyer. These are an assembly station 7‴ for the preassembly of an angled distributor plug boot, a stripping station 8‴, a connector crimping press 9‴ and an assembly station 10‴ for assembly of the distributor plug. At 11‴ a gripper then picks the cable up at its drooping end, transfers it to a checking station 12‴ and finally to a deposit 13‴. The described sequence of processing stations results from the fact that the cable end processed last can be stripped only after the angular cap has been installed in the processing station 7‴.

The embodiments show how variably the devices can be adapted to various manufacturing tasks, since subsequent to the very quickly and accurately operating length trimming and positioning station 2, which arrange the cables in a position allowing optimal transport and processing, subsequent processing stations can in the best possible position and mutual arrangement, easily accessible from both sides, be installed in easily loosened and exchangeable fashion on a rail along which the holders transferring the cables are being passed. Besides, it is obvious that the illustrated and described cleaning of the strand ends, from talcum, by means of rotating brushes 116, the design of the holders 56, the arrangement of a companion conveyer belt 120 supporting the cable loops 46, and the processes and arrangements described in connection with FIGS. 12 through 14 can be used also in other types of devices for the finishing of cables.

What is claimed is:

1. A process for the trimming of cables from a cable supply into predetermined cable lengths and for the processing of the cable ends, wherein the cable front end is moved into a predetermined intermediate position and is thereafter bent over by the formation of a loop into a predetermined starting position so that said cable front end is facing in a direction opposite to the feed direction, enlarging the cable loop to a predetermined length by continued cable feeding and severing the cable rear end from the cable supply and holding said cable rear end in a predetermined starting position essentially parallel with the cable front end and in identical alignment therewith, characterized by continuously advancing the cable front end until it strikes a bending means, thereby triggering movement of the bending means into its starting position, the cable being further continuously fed until the cable loop has reached the predetermined length.

2. The process according to claim 1, characterized in that in the case of multi-conductor cables, whose separately insulated strands are sheathed jointly by an external cable sleeve, the sleeve is removed on at least one cable end (86, 88) and the strands processed by rotating brushes (116) whose friction force acts essentially in the longitudinal direction and outwardly on the ends of the strands.

3. An apparatus for the trimming of cables from a continuously feeding cable supply into predetermined cable lengths and for processing the ends of the cable lengths, comprising a feed and length measuring device, a cutting device and a positioning device for inserting the cable ends in holders by which they can be transferred to processing stations, the positioning device including a rotatably mounted swivel part for bending the cable into a loop when the cable front end reaches a predetermined intermediate position during feeding thereof so that said cable front end faces a direction opposite to the feed direction after bending of said cable characterized in that the swivel part comprises engaging means for engaging the moving cable front end in its intermediate position during continuous feeding of the cable, and in that the cutting device is mounted between the feed and length measuring device and the swivel part and is adapted to sever the cable after a cycle of continuous feeding of said cable during which the cable front end is engaged by the swivel part and the cable is formed into an essentially U-shaped loop of predetermined length.

4. The apparatus according to claim 3, characterized in that the feed and length measuring device (20, 22) is followed by a guide channel (32, 34) for the cable, on the fixed front end (32) of which channel, viewed from the feed device (20, 22) there is the cutting device (82) arranged while the rear section (34) of said channel is arranged in the swivel part (28), which is prestressed by a spring (40) and can swing about approximately 180° as soon as it has been advanced beyond a dead center by the cable front end (88) which in the guide channel (32, 34) impinges with the feed force on a stop (102).

5. The apparatus according to claim 4, characterized in that on the rear section (34) of the guide channel barbs (104) are provided which prevent a retraction of the cable.

6. The apparatus according to claim 4, characterized in that the swivel part (28) can be returned to the starting position, against the spring force (40), by a swivel motor (48) which is coupled through a disengageable clutch (38, 52) in which starting position the rear section is in alignment with the front section of the guide channel (32, 34), wherein the swivel motor (48), operable in both directions of rotation, can be disengaged after the swivel part (28) has reached its starting position and can be engaged again through the cable advance after overcoming the dead center position of the swivel part (28), so as to rotate the swivel part into its swing-out limit position.

7. The apparatus according to claim 4, characterized in that the guide channel (32, 34) features behind the cutting device (82) a lowerable bottom (30) with a cutout (98), in the area of which latter the cable ends (86, 88) can be inserted in the holders (56) as the bottom (30) is being lowered.

8. The apparatus according to claim 7, characterized in that prior to the lowering of the bottom (30) of the guide channel (32, 34) an upper tool (58) can be lowered on which a knife (82) of the cutting device end, via springs, several posts (76) are mounted for holding the cable (46) down on the lowerable bottom (30).

9. The apparatus according to claim 3, characterized in that the holders (56) comprise a pair of tongue which in the closing direction are elastically prestressed and have an essentially dovetailed cross-section.

10. The apparatus according to claim 3, characterized in that the holders (56) can upon the stripping of the cable ends (86, 88) be moved in a processing station (4) where the exposed strands of the cable can be processed by rotating brushes (116) with an irregular radius across their circumference, which brushes exert a traction force on the strands.

11. The apparatus according to claim 3, characterized in that parallel with the row of processing stations (2–5) there is a companion conveyer belt (120) arranged which supports the formed cable loops (46) and can be moved in synchronism with the holders (56) along the row of processing stations (2–5).

* * * * *